United States Patent
Matsuoka et al.

(10) Patent No.: US 12,247,100 B2
(45) Date of Patent: Mar. 11, 2025

(54) POLYARYLENE ETHER KETONE RESIN AND PRODUCTION METHOD THEREFOR, AND MOLDED ARTICLE

(71) Applicant: DIC Corporation, Tokyo (JP)

(72) Inventors: Ryuichi Matsuoka, Sakura (JP); Shoko Nishida, Sakura (JP); Masaya Masumoto, Sakura (JP); Katsuya Maeyama, Yonezawa (JP)

(73) Assignee: DIC Corporation, Tokyo (JP)

( * ) Notice: Subject to any disclaimer, the term of this patent is extended or adjusted under 35 U.S.C. 154(b) by 1052 days.

(21) Appl. No.: 16/769,804

(22) PCT Filed: Jan. 22, 2019

(86) PCT No.: PCT/JP2019/001834
§ 371 (c)(1),
(2) Date: Jun. 4, 2020

(87) PCT Pub. No.: WO2019/142942
PCT Pub. Date: Jul. 25, 2019

(65) Prior Publication Data
US 2021/0171710 A1 Jun. 10, 2021

(30) Foreign Application Priority Data
Jan. 22, 2018 (JP) .................................. 2018-008442

(51) Int. Cl.
| C08G 65/40 | (2006.01) |
| C08G 67/00 | (2006.01) |
| C08L 71/12 | (2006.01) |

(52) U.S. Cl.
CPC ......... *C08G 65/4012* (2013.01); *C08G 67/00* (2013.01); *C08L 71/12* (2013.01); *C08G 2650/40* (2013.01); *C08L 2203/30* (2013.01)

(58) Field of Classification Search
CPC .......................... C08G 65/4012; C08G 67/00; C08G 2650/40; C08L 71/12; C08L 2203/30
USPC ....................................................... 528/125
See application file for complete search history.

(56) References Cited

U.S. PATENT DOCUMENTS

| 3,065,205 A | 11/1962 | Willard, Jr. |
| 5,155,203 A | 10/1992 | Darnell et al. |
| 5,175,236 A | 12/1992 | Irwin |
| 2009/0295042 A1* | 12/2009 | Pfister ................... B29C 64/153 |
| | | 118/620 |
| 2016/0122527 A1* | 5/2016 | Decraemer ............... C08J 3/124 |
| | | 525/471 |
| 2018/0237588 A1* | 8/2018 | Mizuguchi ............. C08G 67/00 |
| 2019/0211141 A1* | 7/2019 | Matsutani ............... C08G 61/02 |
| 2022/0056210 A1* | 2/2022 | Matsuoka .......... C08G 65/4012 |

FOREIGN PATENT DOCUMENTS

| CN | 103709379 A | 4/2014 |
| CN | 107531990 A | 1/2018 |
| EA | 0124276 A2 | 11/1984 |
| EP | 0124276 A2 | 11/1984 |
| JP | 50-039399 A | 4/1975 |
| JP | 54-090296 A | 7/1979 |
| JP | 56-000451 B1 | 1/1981 |
| JP | 58-208320 A | 12/1983 |
| JP | S58-219230 A | 12/1983 |
| JP | 60-500961 A | 6/1985 |
| JP | 61-247731 A | 11/1986 |
| JP | 04-502635 A | 5/1992 |
| JP | 05-148717 A | 6/1993 |
| JP | 06-322111 A | 11/1994 |
| JP | 2002-538248 A | 11/2002 |
| JP | 2003-147074 A | 5/2003 |

(Continued)

OTHER PUBLICATIONS

Office Action mailed Dec. 27, 2021, issued for Chinese Patent Application No. 201980006821.7 and English translation thereiof.

(Continued)

*Primary Examiner* — Tanisha Diggs
(74) *Attorney, Agent, or Firm* — Locke Lord LLP; James E. Armstrong, IV; Nicholas J. DiCeglie, Jr.

(57) ABSTRACT

A polyarylene ether ketone resin has a repeating unit (1-1) represented by general formula (1-1) below and a repeating unit (2-1) represented by general formula (2-1) below. In the formulae, R is a hydrogen atom or an alkyl group having 1 to 4 carbon atoms, Ar1 and Ar2 are each a divalent organic group (3-1) represented by general formula (3-1) below, and n is 0 or 1.

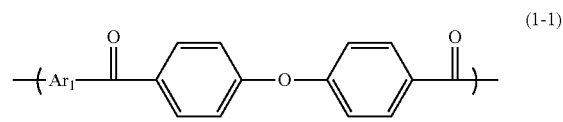

(1-1)

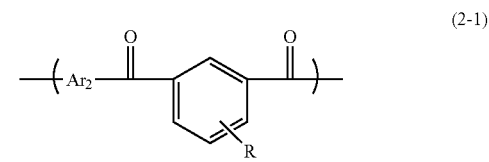

(2-1)

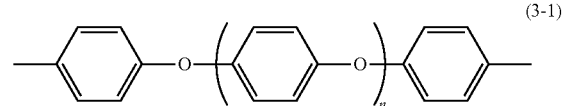

(3-1)

5 Claims, No Drawings

(56) References Cited

FOREIGN PATENT DOCUMENTS

| | | |
|---|---|---|
| JP | 2010-006057 A | 1/2010 |
| WO | 90/06957 A1 | 6/1990 |
| WO | 00/52075 A1 | 9/2000 |
| WO | 2015/182621 A1 | 12/2015 |
| WO | 2016/038370 A1 | 3/2016 |

OTHER PUBLICATIONS

International Search Report mailed Apr. 16, 2019, issued for PCT/JP2019/001834 and English translation thereof.
Supplementary European Search Report mailed Sep. 6, 2021, issued for European Patent Application No. 19741403.0.

* cited by examiner

POLYARYLENE ETHER KETONE RESIN AND PRODUCTION METHOD THEREFOR, AND MOLDED ARTICLE

TECHNICAL FIELD

The present invention relates to a polyarylene ether ketone resin and a production method therefor, and a molded article containing the polyarylene ether ketone resin.

This application claims priority based on Japanese Patent Application No. 2018-008442 filed in Japan on Jan. 22, 2018, the contents of which are incorporated herein.

BACKGROUND ART

Polyarylene ether ketone resins (may be abbreviated as "PAEK resins" hereinafter) are widely used as crystalline super engineering plastics which have excellent heat resistance, chemical resistance, toughness, etc. and which can be continuously used at high temperature for applications such as electric/electronic components, automobile components, medical components, fibers, films, and the like.

As a PAEK resin, there has been well known a polyether ether ketone resin (may be abbreviated as a "PEEK resin" hereinafter) which is produced by aromatic nucleophilic substitution-type solution polycondensation reaction of two monomers including 4,4'-difluorobenzophenone and hydroquinone in diphenyl sulfone using potassium carbonate and which has two ether groups and one ketone group in a repeating unit (refer to Patent Literature 1). Also, there have been a polyether ketone resin (abbreviated as a "PEK resin" hereinafter) produced by using 4,4'-dihydroxybenzophenone in place of hydroquinone and having one each of an ether group and a ketone group in a repeating unit, and a polyether ketone-ketone resin (abbreviated as a "PEKK resin" hereinafter) having one ether group and two ketone groups in a repeating unit.

However, the aromatic nucleophilic substitution-type solution polycondensation reaction used for producing these PAEK resins has disadvantages such as high material cost due to the use of expensive 4,4'-difluorobenzophenone as a monomer and high production process cost due to a reaction temperature of 300° C. or more, and thus has the tendency to increase the resin price.

Therefore, aromatic electrophilic substitution-type solution polycondensation reaction is known for producing a PAEK resin under mild polymerization conditions without using 4,4'-difluorobenzophenone as a monomer. Examples of use of the aromatic electrophilic substitution-type solution polycondensation reaction include a PEK resin (Patent Literature 2) produced by a method of reacting 4-phenoxybenzoic acid chloride in the presence of hydrogen fluoride/boron trifluoride, a PEKK resin (Patent Literature 3) produced by a method of reacting terephthalic acid chloride with diphenyl ether in the presence of a Lewis acid, a PEK resin (Patent Literature 4) produced by a method of reacting 4-phenoxybenzoic acid in the presence of a mixture of methanesulfonic acid and diphosphorus pentoxide, and the like.

CITATION LIST

Patent Literature

PTL 1: Japanese Unexamined Patent Application Publication No. 54-090296

PTL 2: Japanese Examined Patent Application Publication No. 56-000451

PTL 3: U.S. Pat. No. 3,065,205

PTL 4: Japanese Unexamined Patent Application Publication No. 61-247731

SUMMARY OF INVENTION

Technical Problem

PAEK resins such as the usual PEEK resin, PEK resin, and PEKK resin described above, and the like are partially crystalline polymers and have a glass transition temperature of as high as 140° C. or more and excellent heat resistance, but have a crystal melting point of as high as 340° C. or more and have the disadvantage of poor moldability due to the need for high temperature and high pressure for molding.

An object of the present invention is to provide a polyarylene ether ketone resin having excellent heat resistance and a high glass transition temperature and also having a crystal melting point, which can be controlled while maintaining high crystallinity, and good moldability. Also, an object of the present invention is to provide a production method suitable for producing the polyarylene ether ketone resin.

Solution to Problem

It has been considered that super engineering plastics such as a PAEK resin and the like are desirably polymers having a uniform structure having as little impurities as possible in order to realize high heat resistance. Therefore, a polymer having a single repeating unit has been mainly developed as a PAEK resin. However, a single repeating unit structure has difficulty in adjusting thermophysical properties such as the crystal melting point and the like and thus has difficulty in improving moldability.

As a result of repeated earnest studies for solving the problem, the inventors found that a PAEK resin produced by copolymerizing a repeating unit (1-1) described below, which is a rigid and tough component, and a repeating unit (2-1) described below, which is a flexible component, has a crystal melting point which can be controlled while maintaining high crystallinity by adjusting the ratio of the repeating unit (1-1) to the repeating unit (2-1), and exhibits good moldability, leading to the achievement of the present invention.

That is, the present invention includes the following configurations.

[1] A polyarylene ether ketone resin having a repeating unit (1-1) represented by general formula (1-1) below and a repeating unit (2-1) represented by general formula (2-1) below.

[Chem. 1]

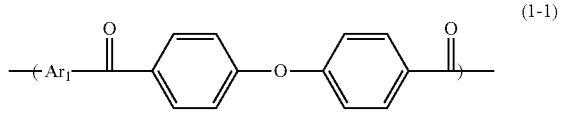

[Chem. 2]

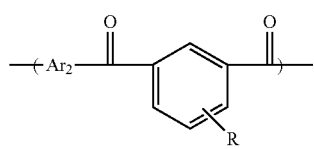
(2-1)

(In the formulae, R is a hydrogen atom or an alkyl group having 1 to 4 carbon atoms, and Ar1 and Ar2 are each a divalent organic group (3-1) represented by general formula (3-1) below.)

[Chem. 3]

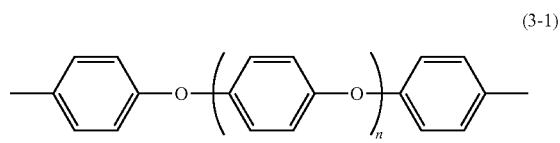
(3-1)

(In the formula, n is 0 or 1.)

[2] The polyarylene ether ketone resin described above in [1], in which the ratio of the repeating unit (1-1) to the repeating unit (2-1) is within a range of 95:5 to 50:50 in terms of molar ratio.

[3] A method for producing the polyarylene ether ketone resin described above in [1] or [2], including reacting a monomer (1-2) represented by formula (1-2) below, a monomer (2-2) represented by general formula (2-2) below, and a monomer (3-2) represented by general formula (3-2) below in the presence of organic sulfonic acid and diphosphorus pentoxide.

[Chem. 4]

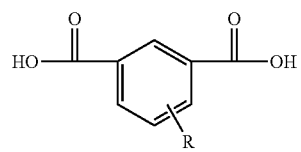
(1-2)

[Chem. 5]

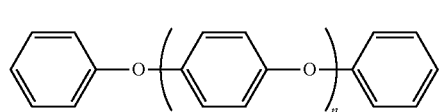
(2-2)

(In the formula, R is a hydrogen atom or an alkyl group having 1 to 4 carbon atoms.)

[Chem. 6]

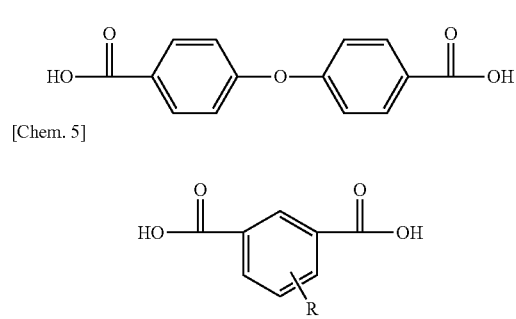
(3-2)

(In the formula, n is 0 or 1.)

[4] A method for producing the polyarylene ether ketone resin described above in [1] or [2], including reacting a monomer (2-2) represented by general formula (2-2) below with a monomer (3-2) represented by general formula (3-2) below to synthesize a reaction product (2-3) represented by general formula (2-3) below, and reacting the reaction product (2-3) with a monomer (1-2) represented by formula (1-2) below.

[Chem. 7]

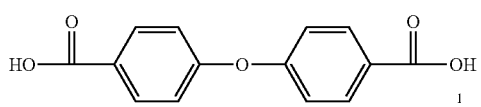
(1-2)

[Chem. 8]

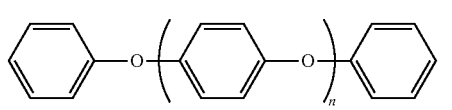
(2-2)

(In the formula, R is a hydrogen atom or an alkyl group having 1 to 4 carbon atoms.)

[Chem. 9]

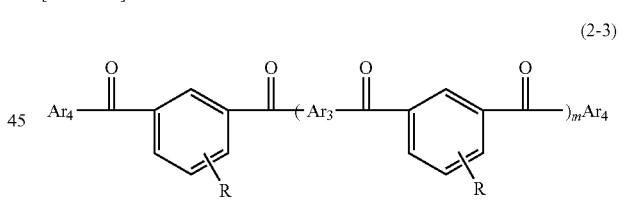
(3-2)

(In the formula, n is 0 or 1.)

[Chem. 10]

(2-3)

$Ar_4$—(C(=O)—Ar—C(=O)—(Ar_3)—C(=O)—Ar—C(=O)—)$_m$Ar_4

(In the formula, R is a hydrogen atom or an alkyl group having 1 to 4 carbon atoms, m is an integer value of 0 or more, Ar3 is a divalent organic group (3-3) represented by general formula (3-3) below, and Ar4 is a monovalent organic group (3-4) represented by general formula (3-4) below.)

[Chem. 11]

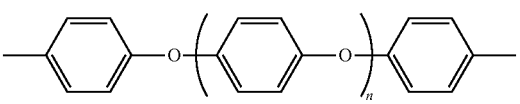
(3-3)

(In the formula, n is 0 or 1.)

[Chem. 12]

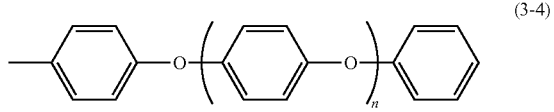

(3-4)

(In the formula, n is 0 or 1.)

[5] The method for producing a polyarylene ether ketone described above in [3] or [4], in which the ratio of the amount of the monomer (2-2) added to the amount of the monomer (3-2) added is within a range of 5:100 to 50:100 in terms of molar ratio.

[6] A molded article containing the polyarylene ether ketone resin described above in [1] or [2].

Advantageous Effects of Invention

A polyarylene ether ketone resin of the present invention has excellent heat resistance and a high glass transition temperature and also has a crystal melting point, which can be controlled while maintaining high crystallinity, and good moldability. Also, a method for producing a polyarylene ether ketone resin of the present invention is suitable for producing the polyarylene ether ketone resin of the present invention.

DESCRIPTION OF EMBODIMENTS (Polyarylene Ether Ketone Resin (PAEK Resin))

A PAEK resin of the present invention has a repeating unit (1-1) represented by general formula (1-1) below and a repeating unit (2-1) represented by general formula (2-1) below.

[Chem. 13]

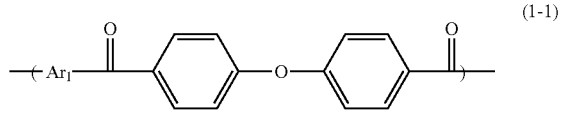

(1-1)

[Chem. 14]

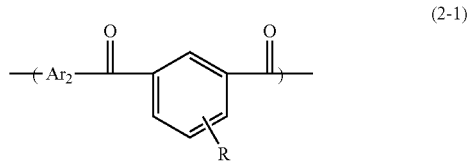

(2-1)

(In the formulae, R is a hydrogen atom or an alkyl group having 1 to 4 carbon atoms, and Ar1 and Ar2 are each a divalent organic group (3-1) represented by general formula (3-1) below.)

[Chem. 15]

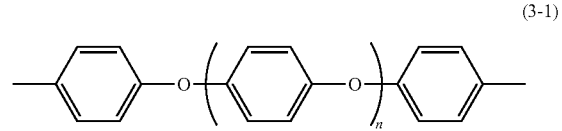

(3-1)

(In the formula, n is 0 or 1.)

The PAEK resin of the present invention has the repeating unit (1-1) which is a rigid and tough component, and the repeating unit (2-1) which is a flexible component, and thus has a crystal melting point (Tm) which can be controlled while maintaining high crystallinity by adjusting the ratio of the repeating unit (1-1) to the repeating unit (2-1), and exhibits good moldability.

In the PAEK resin of the present invention, the ratio in terms of molar ratio of the repeating unit (1-1) to the repeating unit (2-1) is preferably within a range of 95:5 to 50:50, more preferably within a range of 92:8 to 53:48, and particularly preferably within a range of 90:10 to 55:45. With the ratio within the range, the glass transition temperature (Tg) can be adjusted to be high by increasing the ratio value of the molar amount of the repeating unit (1-1) to the molar amount of the repeating unit (2-1), and thus the crystallinity and crystal melting point (Tm) can be increased, and the PAEK resin having excellent heat resistance can be produced. Also, with the ratio within the range, the crystal melting point (Tm) can be made relatively low by decreasing the ratio value of the molar amount of the repeating unit (1-1) to the molar amount of the repeating unit (2-1), and the PAEK resin having excellent moldability can be produced. By adjusting the ratio, the glass transition temperature (Tg) of the PAEK resin of the present invention can be adjusted to 120° C. to 150° C., preferably 125° C. to 150° C., and more preferably 130° C. to 148° C., the crystal melting point (Tm) can be adjusted to 260° C. to 340° C., preferably 285° C. to 338° C., and more preferably 290° C. to 336° C., the crystallinity can be adjusted to 26% to 40%, preferably 28% to 39%, and more preferably 30% to 38%, and the 5% weight-loss temperature (Td5) can be adjusted to 500° C. to 550° C., preferably 510° C. to 545° C., and more preferably 525° C. to 540° C. The PAEK resin excellent in both heat resistance and moldability can be produced by optimizing the ratio value of the repeating unit (1-1) to the repeating unit (2-1).

(Method for Producing Polyarylene Ether Ketone Resin (PAEK Resin))

According to an aspect, a method for producing a PAEK resin of the present invention is a method for producing the PAEK resin, the method including reacting a monomer (1-2) represented by formula (1-2) below, a monomer (2-2) represented by general formula (2-2) below, and a monomer (3-2) represented by general formula (3-2) below in the presence of organic sulfonic acid and diphosphorus pentoxide.

[Chem. 16]

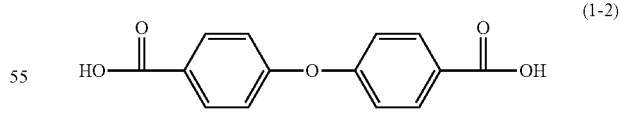

(1-2)

[Chem. 17]

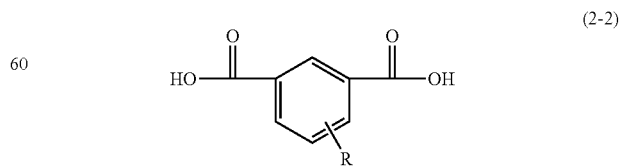

(2-2)

(In the formula, R is a hydrogen atom or an alkyl group having 1 to 4 carbon atoms.)

[Chem. 18]

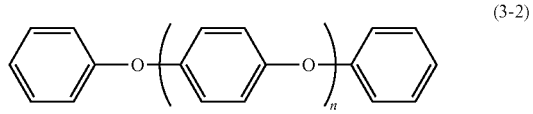

(3-2)

(In the formula, n is 0 or 1.)

Aromatic electrophilic substitution-type solution polycondensation reaction can cause reaction under mild polymerization conditions, and specifically, the PAEK resin can be produced by mixing organic sulfonic acid and diphosphorus pentoxide at 20° C. to 100° C. for 1 to 40 hours, adding the monomer (1-2), the monomer (2-2), and the monomer (3-2) to the resultant mixture and mixing the mixture, increasing the temperature, and then reacting the monomers at one time, for example, at 40° C. to 80° C. for 1 to 100 hours.

Examples of the organic sulfonic acid include methanesulfonic acid, ethanesulfonic acid, trifluoromethanesulfonic acid, benzenesulfonic acid, p-toluenesulfonic acid (tosic acid), and the like.

The ratio in terms of weight ratio of the amount of the organic sulfonic acid added to the amount the diphosphorus pentoxide added is preferably within a range of 25:100 to 1:100, preferably within a range of 20:100 to 2:100, or preferably within a range of 15:100 to 5:100.

Examples of the monomer (2-2) include isophthalic acid, 5-methylisophthalic acid, 2-methylisophthalic acid, 4-methylisophthalic acid, 5-ethylisophthalic acid, 2-ethylisophthalic acid, 4-ethylisophthalic acid, 5-propylisophthalic acid, 2-propylisophthalic acid, 4-propylisophthalic acid, 5-butylisophthalic acid, 2-butylisophthalic acid, 4-butylisophthalic acid, and the like.

Examples of the monomer (3-2) include diphenyl ether (n=0) and 4-diphenoxybenzene (n=1).

The ratio in terms of weight ratio of the total amount of the monomer (1-2), monomer (2-2) and monomer (3-2) added to the total amount of the organic sulfonic acid and diphosphorus pentoxide added is preferably within a range of 1:100 to 40:100, preferably within a range of 2:100 to 30:100, or preferably within a range of 5:100 to 20:100.

Although not limited to the production method described above, the PAEK resin of the present invention can also be produced by, for example, reacting the monomer (2-2) with the monomer (3-2) and a monomer (4-2) represented by general formula (4-2) below in the presence of an organic sulfonic acid and diphosphorus pentoxide.

[Chem. 19]

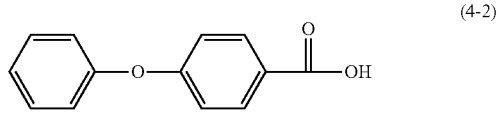

(4-2)

This production method also uses aromatic electrophilic substitution-type solution polycondensation reaction and can cause reaction under mild polymerization conditions, and specifically, the PAEK resin can be produced by mixing organic sulfonic acid and diphosphorus pentoxide at 20° C. to 100° C. for 1 to 40 hours, adding the monomer (2-2), the monomer (3-2), and the monomer (4-2) to the resultant mixture and mixing the mixture, increasing the temperature, and then reacting the monomers, for example, at 40° C. to 80° C. for 1 to 100 hours.

The PAEK resin of the present invention can also be produced by, for example, reacting the monomer (3-2) with a monomer (5-2) represented by general formula (5-2) below and a monomer (6-2) represented by general formula (6-2) below in the presence of a Lewis acid catalyst such as anhydrous aluminum chloride or the like.

[Chem. 20]

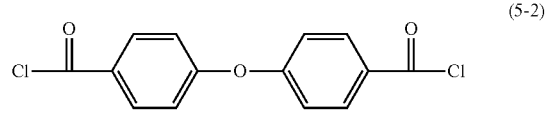

(5-2)

[Chem. 21]

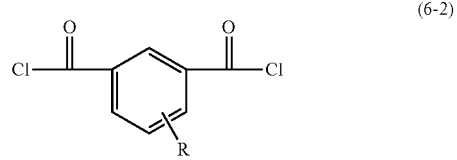

(6-2)

(In the formula, R is a hydrogen atom or an alkyl group having 1 to 4 carbon atoms.)

Also, this production method uses aromatic electrophilic substitution-type solution polycondensation reaction and thus can cause reaction under mild polymerization conditions, and specifically, the PAEK resin can be produced by dissolving the monomer (3-2), the monomer (5-2), and the monomer (6-2) in a solvent such as 1,2-dichlorobenzene or the like, adding and uniformly dissolving anhydrous aluminum chloride in the resultant solution in a nitrogen atmosphere, for example, after cooling to −10° C. to 0° C., then gradually increasing the temperature, and carrying out reaction at 20° C. to 40° C. for 1 to 100 hours.

A method for producing a PAEK resin in another aspect of the present invention is a method for producing the PAEK resin, the method including reacting the monomer (2-2) with the monomer (3-2) to synthesize a reaction product (2-3) represented by general formula (2-3) below, and reacting the reaction product (2-3) with the monomer (1-2).

[Chem. 22]

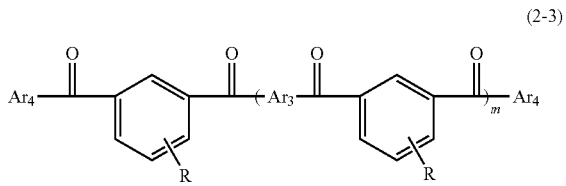

(2-3)

(In the formula, R is a hydrogen atom or an alkyl group having 1 to 4 carbon atoms, m is an integer value of 0 or more, Ar3 is a divalent organic group (3-3) represented by general formula (3-3) below, and Ar4 is a monovalent organic group (3-4) represented by general formula (3-4) below.)

[Chem. 23]

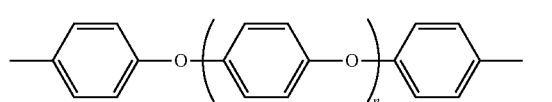
(3-3)

(In the formula, n is 0 or 1.)

[Chem. 24]

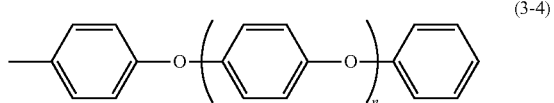
(3-4)

(In the formula, n is 0 or 1.)

Also, this production method uses aromatic electrophilic substitution-type solution polycondensation reaction and thus can cause reaction under mild polymerization conditions, and specifically, the reaction product (2-3) can be synthesized by mixing the organic sulfonic acid and diphosphorus pentoxide at 20° C. to 100° C. for 1 to 40 hours, adding the monomer (2-2) and the monomer (3-2) to the resultant mixture, mixing the mixture, increasing the temperature, and then reacting the monomers, for example, at 40° C. to 80° C. for 0.5 to 20 hours, more preferably 50° C. to 70° C. for 1 to 15 hours. The PAEK resin can be produced by adding the monomer (1-2) to the reaction solution, mixing the resultant mixture, and carrying out reaction at, for example, 40° C. to 80° C. for 1 to 60 hours, more preferably 50° C. to 70° C. for 5 to 50 hours.

The ratio in terms of molar ratio of the amount of the monomer (2-2) added to the amount of the monomer (3-2) added is preferably within a range of 5:100 to 50:100, more preferably within a range of 8:100 to 48:100, and particularly preferably within a range of 10:100 to 45:100.

The ratio in terms of molar ratio of the total amount of the monomer (1-2) and monomer (2-2) added to the amount of the monomer (3-2) added is preferably within a range of 85:100 to 115:100, preferably within a range of 90:100 to 110:100, and preferably within a range of 92:100 to 108:100.

In the reaction product (2-3), m is preferably 0 or 1. In the reaction solution, an average of m is preferably 0 to 1, preferably 0 to 0.5, and preferably 0 to 0.2. The nearer to 0 the average of m becomes, the nearer to an alternating copolymer the form of the resultant PAEK resin becomes and the more improved the uniformity and thermal stability of the whole polymer tend to become.

In the method of reacting the monomer (1-2), the monomer (2-2), and the monomer (3-2) at one time, polymerization reaction of the monomer (1-2) with the monomer (3-2) proceeds in preference to polymerization reaction of the monomer (2-2) with the monomer (3-2) because the monomer (1-2) and the monomer (3-2) are rich in reactivity, and polymerization reaction of the monomer (2-2) with the monomer (3-2) takes place in the latter stage of polymerization reaction. Therefore, the resultant PAEK resin has a nonuniform structure which is separated into a segment of the repeating unit (1-1) and a segment of the repeating unit (2-1), and consequently thermal decomposition easily occurs from the repeating unit (2-1) having relatively low heat resistance, thereby easily decreasing the heat resistance of the whole PAEK resin.

When the polymerization reaction of the monomer (1-2) with the monomer (3-2) preferentially takes place, the resultant polymer composed of only the constituent unit (1-1) is undissolved in methanesulfonic acid, thereby terminating the reaction. Alternatively, a polymer composed of only the repeating unit (1-1) and a polymer composed of only the repeating unit (2-1) are separately produced, thereby producing a polymer which cannot be molded due to the occurrence of phase separation.

The method using anhydrous aluminum chloride in place of the mixture of methanesulfonic acid and diphosphorus pentoxide is likely to cause difficulty in controlling the polymer sequence because of the excessively high polymerization rate.

Whereas, when in the divided charging order of the monomers, the reaction product (2-3) is synthesized from the monomer (2-2) and the monomer (3-2), and then the reaction product (2-3) is reacted with the monomer (1-2), the polymerization reaction of the monomer (1-2) proceeds while maintaining solubility in methanesulfonic acid over the entire polymerization reaction because the reaction product (2-3) has relatively high solubility in methanesulfonic acid. As a result, the repeating unit (1-1) and the repeating unit (2-1) are introduced in a form close to a random copolymer or an alternating copolymer in a polymer sequence, and the uniformity and thermal stability of the whole polymer tend to become improved.

(Molded Article Containing Polyarylene Ether Ketone Resin (PAEK Resin))

The PAEK resin of the present invention has excellent heat resistance and high glass transition temperature (Tg) and also has a crystal melting point (Tm), which can be controlled while maintaining high crystallinity, and good moldability, and thus can be used as a neat resin and used as a compound such as glass fibers, carbon fibers, fluorocarbon resin, or the like. In addition, molding the PAEK resin of the present invention can produce primary processed articles such as a rod, a board, a film, a filament, and the like, and secondary processed articles such as various injection/cutting processed articles, a gear, a bearing, a composite, an implant, a 3D molded articles, and the like. These molded articles containing the PAEK resin of the present invention can be used for automobile, airplane, electric/electronic and medical members, etc.

EXAMPLES

The present invention is described in further detail below by giving examples, but the present invention is not limited to these examples.

(Glass Transition Point (Tg) and Crystal Melting Point (Tm))

The glass transition point (Tg) and crystal melting point (Tm) were determined by measurement from 40° C. to 400° C. at a heating condition of 20° C./min in a nitrogen stream at 50 mL/min using a DSC apparatus (Pyris Diamond) manufactured by Perkin Elmer Corporation.

(5% Weight-Loss Temperature (Td5))

The 5% weight-loss temperature (Td5) was measured by measurement using a TG-DTA apparatus (Rigaku Corporation, TG-8120) in a nitrogen stream at 20 mL/min and a heating rate of 20° C./min.

(Crystallinity)

The amount of melting heat was determined by heating to 400° C. at a heating condition of 20° C./min in a nitrogen stream at 50 mL/min, next cooling to 40° C. at a cooling condition of 5° C./min, and then performing measurement from 40° C. to 400° C. at a heating condition of 20° C./min using a DSC apparatus (Pyris Diamond) manufactured by Perkin Elmer Corporation. The crystallinity was calculated by the following formula.

Crystallinity (%)=$\Delta Hm/\Delta Hc \times 100$

Herein, $\Delta Hm$ is the amount of melting heat of polymer, and $\Delta Hc$ is 130 J/g which is the amount of melting heat of a PEEK resin perfect crystal.

(Reduced Viscosity)

The outflow time of each of a solvent and a polymer solution prepared by dissolving 0.3 g of polymer in 100 ml of the solvent was measured at 25° C. by using a Canon-Fenske viscometer, and the reduced viscosity was calculated by the following formula. The solvent used was a solution prepared by mixing chloroform and trifluoroacetic acid at a weight ratio of 4:1.

Reduced viscosity (dl/g)=$(t-t0)/(c \times t0)$

Herein, t0 is the outflow time of the solvent, t is the outflow time of the polymer solution, and c is the polymer concentration (g/dl) in the polymer solution.

Example 1

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 2.0 g of isophthalic acid and 40.2 g of diphenyl ether were charged, heated to 60° C., and then reacted for 10 hours. Then, 57.9 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.1 dl/g, and it could be confirmed that a PAEK resin according to Example 1 is produced.

Also, the glass transition temperature (Tg), crystal melting point (Tm), and crystallinity of the PAEK resin according to Example 1 were measured, and the results are shown in Table 1-1.

Example 2

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 4.0 g of isophthalic acid and 40.6 g of diphenyl ether were charged, heated to 60° C., and then reacted for 10 hours. Then, 55.4 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.2 dl/g, and it could be confirmed that a PAEK resin according to Example 2 is produced.

Also, the glass transition temperature (Tg), crystal melting point (Tm), and crystallinity of the PAEK resin according to Example 2 were measured, and the results are shown in Table 1-1.

Example 3

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 8.1 g of isophthalic acid and 41.5 g of diphenyl ether were charged, heated to 60° C., and then reacted for 10 hours. Then, 50.4 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.2 dl/g, and it could be confirmed that a PAEK resin according to Example 3 is produced.

Also, the glass transition temperature (Tg), crystal melting point (Tm), and crystallinity of the PAEK resin according to Example 3 were measured, and the results are shown in Table 1-1.

Example 4

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 12.4 g of isophthalic acid and 42.5 g of diphenyl ether were charged, heated to 60° C., and then reacted for 10 hours. Then, 45.1 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.2 dl/g, and it could be confirmed that a PAEK resin according to Example 4 is produced.

Also, the glass transition temperature (Tg), crystal melting point (Tm), and crystallinity of the PAEK resin according to Example 4 were measured, and the results are shown in Table 1-1.

Example 5

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 17.0 g of isophthalic acid and 43.5 g of diphenyl ether were charged, heated to 60° C., and then reacted for 10 hours. Then, 39.6 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.0 dl/g, and it could be confirmed that a PAEK resin according to Example 5 is produced.

Also, the glass transition temperature (Tg), crystal melting point (Tm), and crystallinity of the PAEK resin according to Example 5 were measured, and the results are shown in Table 1-1.

Example 6

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 21.7 g of isophthalic acid and 44.5 g of diphenyl ether were charged, heated to 60° C., and then reacted for 10 hours. Then, 33.8 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 0.8 dl/g, and it could be confirmed that a PAEK resin according to Example 6 is produced.

Also, the glass transition temperature (Tg), crystal melting point (Tm), and crystallinity of the PAEK resin according to Example 6 were measured, and the results are shown in Table 1-1.

Example 7

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 10.1 g of isophthalic acid and 53.2 g of 1,4-diphenoxbenzene were charged, heated to 60° C., and then reacted for 10 hours. Then, 36.7 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.3 dl/g, and it could be confirmed that a PAEK resin according to Example 7 is produced.

Also, the glass transition temperature (Tg), crystal melting point (Tm), and crystallinity of the PAEK resin according to Example 7 were measured, and the results are shown in Table 1-1.

Example 8

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 13.3 g of 5-methylisophthalic acid and 42.0 g of diphenyl ether were charged, heated to 60° C., and then reacted for 10 hours. Then, 44.6 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.1 dl/g, and it could be confirmed that a PAEK resin according to Example 8 is produced.

Also, the glass transition temperature (Tg), crystal melting point (Tm), and crystallinity of the PAEK resin according to Example 8 were measured, and the results are shown in Table 1-2.

Example 9

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 16.0 g of 5-tert-butylisophthalic acid and 40.8 g of diphenyl ether were charged, heated to 60° C., and then reacted for 10 hours. Then, 43.3 g of 4,4'-oxybisbenzoic acid was added and further reacted for 40 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.2 dl/g, and it could be confirmed that a PAEK resin according to Example 9 is produced.

Also, the glass transition temperature (Tg), crystal melting point (Tm), and crystallinity of the PAEK resin according to Example 9 were measured, and the results are shown in Table 1-2.

Example 10

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 12.4 g of isophthalic acid, 45.1 g of 4,4'-oxybisbenzoic acid, and 42.5 g of diphenyl ether were charged, heated to 60° C., and then reacted for 50 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.0 dl/g, and it could be confirmed that a PAEK resin according to Example 10 is produced.

Also, the glass transition temperature (Tg), crystal melting point (Tm), and crystallinity of the PAEK resin according to Example 10 were measured, and the results are shown in Table 1-2.

Example 11

In a four-neck separable flask provided with a nitrogen inlet tube, a thermometer, a reflux condenser, and a sitter, 818 g of methanesulfonic acid and 82 g of diphosphorus pentoxide were charged and stirred in a nitrogen atmosphere at room temperature for 20 hours. Then, 12.4 g of isophthalic acid, 74.8 g of 4-phenoxybenzoic acid, and 12.7 g of diphenyl ether were charged, heated to 60° C., and then reacted for 50 hours. After cooling to room temperature, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 0.9 dl/g, and it could be confirmed that a PAEK resin according to Example 11 is produced.

Also, the glass transition temperature (Tg), crystal melting point (Tm), and crystallinity of the PAEK resin according to Example 11 were measured, and the results are shown in Table 1-2.

Example 12

In a four-neck separable flask provided with a nitrogen inlet tube, a thermometer, a reflux condenser, and a sitter, 864 g of 1,2-dichlorobenzene, 7.0 g of isophthaloyl chloride, 23.6 g of 4,4'-oxybis(benzoyl chloride), and 19.4 g of diphenyl ether were charged and cooled to −5° C. in a nitrogen atmosphere. Then, 86 g of anhydrous aluminum chloride was added, and after being made uniform, the resultant mixture was heated to 30° C. over 2 hours and reacted for 50 hours. Then, the reaction solution was poured into methanol under strong stirring to precipitate a polymer which was then filtered off. The polymer was further washed two times each with methanol and ion exchange water. Then, the polymer was dried under vacuum at 180° C. for 10 hours. The measured reduced viscosity was 1.2 dl/g, and it could be confirmed that a PAEK resin according to Example 12 is produced.

Also, the glass transition temperature (Tg), crystal melting point (Tm), and crystallinity of the PAEK resin according to Example 12 were measured, and the results are shown in Table 1-2.

Comparative Example 1

VICTREX PEEK 150P manufactured by Victrex Inc. was prepared as a PEEK resin according to Comparative Example 1, the reduced viscosity, glass transition temperature (Tg), crystal melting point (Tm), and crystallinity of the resin were measured, and the results are shown in Table 1-2.

Comparative Example 2

VICTREX HT manufactured by Victrex Inc. was prepared as a PEK resin according to Comparative Example 2, the reduced viscosity, glass transition temperature (Tg), crystal melting point (Tm), and crystallinity of the resin were measured, and the results are shown in Table 1-2.

Tables 1-1 and 1-2 show that the PAEK resins of Examples 1 to 12 are resin which can be adjusted to a glass transition temperature (Tg) of 125° C. to 150° C. and a crystallinity of 28% to 40%, and which have excellent heat resistance equivalent to the commercial PEEK resin (Comparative Example 1) and PEK resin (Comparative Example 2). Also, the PAEK resins of Examples 1 to 12 can be controlled to a crystal melting point (Tm) of 280° C. to 339° C. while maintaining the excellent heat resistance and high crystallinity, and have good moldability because the crystal melting points (Tm) thereof are lower than those (Tm) (343° C. and 373° C.) of the commercial PEEK resin (Comparative Example 1) and PEK resin (Comparative Example 2).

In particular, Tables 1-1 and 1-2 indicate that the PAEK resins of Examples 1 to 5 and 7 to 9 have a 5% weight-loss temperature (Td5) of 532° C. to 540° C. and thus have more excellent heat resistance than the PAEK resins of Examples 10 to 12 having a 5% weight-loss temperature (Td5) of 508° C. to 522° C. This result is considered to be contributed by the ratio of the repeating unit (1-1) to the repeating unit (2-1) in the PAEK resin and by the divided monomer charging order in which the reaction product (2-3) is synthesized from the monomer (2-2) and the monomer (3-2), and then the reaction product (2-3) is reacted with the monomer (1-2), thereby disorderly introducing the repeating unit (1-1) and the repeating unit (2-1) in a polymer sequence and improving the uniformity and thermal stability of the whole polymer.

TABLE 1-1

|  |  |  | Example 1 | Example 2 | Example 3 | Example 4 | Example 5 | Example 6 | Example 7 |
|---|---|---|---|---|---|---|---|---|---|
| Composition | Repeating unit (1-1) | Molar % | 95 | 90 | 80 | 70 | 60 | 50 | 70 |
|  | Repeating unit (2-1) | Molar % | 5 | 10 | 20 | 30 | 40 | 50 | 30 |
|  |  | R | H | H | H | H | H | H | H |
|  | Organic group (3-1) | n | 0 | 0 | 0 | 0 | 0 | 0 | 1 |
| Production method | Monomer charging order |  | Divided | Divided | Divided | Divided | Divided | Divided | Divided |
| Properties | Tg | ° C. | 150 | 145 | 145 | 144 | 143 | 125 | 141 |
|  | Tm | ° C. | 339 | 335 | 330 | 319 | 310 | 280 | 331 |
|  | Td5 | ° C. | 540 | 540 | 535 | 532 | 532 | 500 | 540 |
|  | Crystallinity | % | 40 | 38 | 38 | 38 | 34 | 28 | 40 |
|  | Reduced viscosity | dl/g | 1.1 | 1.2 | 1.2 | 1.2 | 1.0 | 0.8 | 1.3 |

TABLE 1-2

|  |  |  | Example 8 | Example 9 | Example 10 | Example 11 | Example 12 | Comparative Example 1 | Comparative Example 2 |
|---|---|---|---|---|---|---|---|---|---|
| Composition | Repeating unit (1-1) | Molar % | 70 | 70 | 70 | 70 | 70 | PEEK resin | PEK resin |
|  | Repeating unit (2-1) | Molar % | 30 | 30 | 30 | 30 | 30 |  |  |
|  |  | R | Methyl group | Tert-butyl group | H | H | H |  |  |

TABLE 1-2-continued

| | | | Example 8 | Example 9 | Example 10 | Example 11 | Example 12 | Comparative Example 1 | Comparative Example 2 |
|---|---|---|---|---|---|---|---|---|---|
| Production method | Organic group (3-1) | n | 0 | 0 | 0 | 0 | 0 | | |
| | Monomer charging order | | Divided | Divided | One-time | One-time | One-time | | |
| Properties | Tg | °C. | 140 | 141 | 143 | 144 | 145 | 143 | 153 |
| | Tm | °C. | 315 | 318 | 318 | 318 | 310 | 343 | 373 |
| | Td5 | °C. | 535 | 535 | 522 | 510 | 508 | 550 | 545 |
| | Crystallinity | % | 36 | 35 | 38 | 38 | 38 | 38 | 38 |
| | Reduced viscosity | dl/g | 1.1 | 1.2 | 1.0 | 0.9 | 1.2 | 1.2 | 1.2 |

The invention claimed is:

1. A polyarylene ether ketone resin having a repeating unit (1-1) represented by general formula (1-1) below and a repeating unit (2-1) represented by general formula (2-1) below, wherein the ratio of the repeating unit (1-1) to the repeating unit (2-1) is within a range of 95:5 to 60:40 in terms of molar ratio,

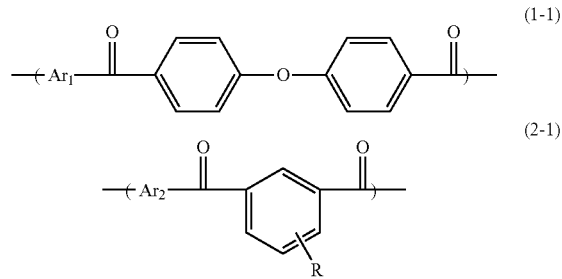

in the formulae (2-1), R is a hydrogen atom or an alkyl group having 1 to 4 carbon atoms, and Ar1 and Ar2 are each a divalent organic group (3-1) represented by general formula (3-1) below

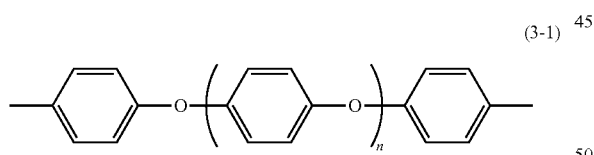

in the formula (3-1), n is 0 or 1.

2. A method for producing the polyarylene ether ketone resin according to claim 1, comprising reacting a monomer (1-2) represented by formula (1-2) below, a monomer (2-2) represented by general formula (2-2) below, and a monomer (3-2) represented by general formula (3-2) below in the presence of organic sulfonic acid and diphosphorus pentoxide,

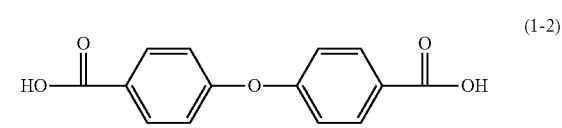

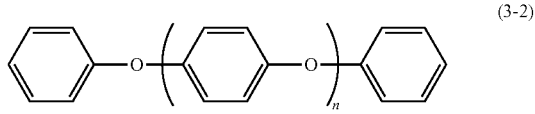

in the formula (2-2), R is a hydrogen atom or an alkyl group having 1 to 4 carbon atoms

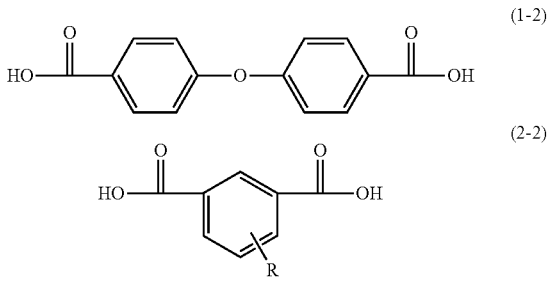

in the formula (3-2), n is 0 or 1.

3. A method for producing the polyarylene ether ketone resin according to claim 1, comprising reacting a monomer (2-2) represented by general formula (2-2) below with a monomer (3-2) represented by general formula (3-2) below to synthesize a reaction product (2-3) represented by general formula (2-3) below, and reacting the reaction product (2-3) with a monomer (1-2) represented by formula (1-2) below,

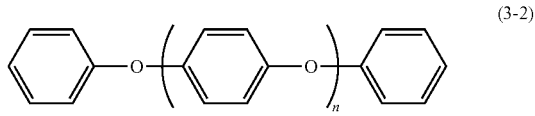

in the formula (2-2), R is a hydrogen atom or an alkyl group having 1 to 4 carbon atoms in the formula (3-2), n is 0 or 1

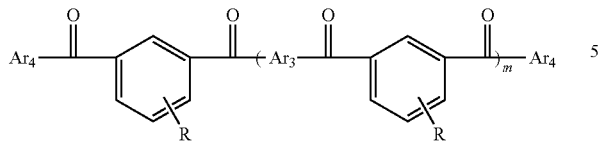
(2-3)

in the formula (2-3), R is a hydrogen atom or an alkyl group having 1 to 4 carbon atoms, m is an integer value of 0 or more, Ar3 is a divalent organic group (3-3) represented by general formula (3-3) below, and Ar4 is a monovalent organic group (3-4) represented by general formula (3-4) below,

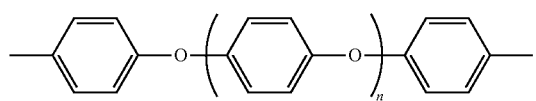
(3-3)

in the formula (3-3), n is 0 or 1

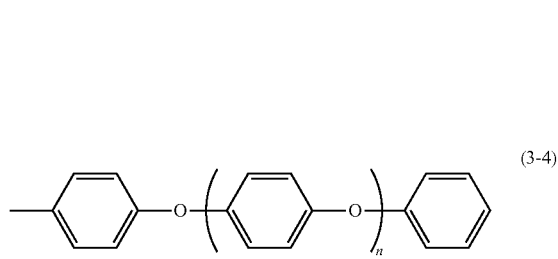
(3-4)

in the formula (3-4), n is 0 or 1.

4. The method for producing a polyarylene ether ketone according to claim 2, wherein the ratio of the amount of the monomer (2-2) added to the amount of the monomer (3-2) added is within a range of 5:100 to 50:100 in terms of molar ratio.

5. A molded article containing the polyarylene ether ketone resin according to claim 1.

\* \* \* \* \*